US012665345B2

(12) United States Patent
Li et al.

(10) Patent No.: US 12,665,345 B2
(45) Date of Patent: Jun. 23, 2026

(54) MINI TYPE FAKRA CONNECTOR

(71) Applicant: Advanced Connectek Inc., New Taipei City (TW)

(72) Inventors: Jiaqi Li, New Taipei City (TW); Qihui Zhu, New Taipei City (TW); Pin-Yuan Hou, New Taipei City (TW); Jia Chen, New Taipei City (TW)

(73) Assignee: Advanced Connectek Inc., New Taipei City (TW)

( * ) Notice: Subject to any disclaimer, the term of this patent is extended or adjusted under 35 U.S.C. 154(b) by 509 days.

(21) Appl. No.: 18/327,815

(22) Filed: Jun. 1, 2023

(65) Prior Publication Data

US 2023/0411893 A1 Dec. 21, 2023

(30) Foreign Application Priority Data

Jun. 17, 2022 (CN) ......................... 202221511795.9

(51) Int. Cl.
*H01R 13/508* (2006.01)
*H01R 13/514* (2006.01)
*H01R 12/71* (2011.01)

(52) U.S. Cl.
CPC ......... *H01R 13/508* (2013.01); *H01R 13/514* (2013.01); *H01R 12/716* (2013.01)

(58) Field of Classification Search
CPC ............................ H01R 13/514; H01R 13/508
USPC .......................................................... 439/345
See application file for complete search history.

(56) References Cited

U.S. PATENT DOCUMENTS 4,688,868 A * 8/1987 Noyes ................ H01R 13/6596 439/108
4,693,533 A * 9/1987 Szczesny ............. H01R 13/508 439/350
5,064,383 A * 11/1991 Locati .................. H01R 13/508 439/417
5,478,254 A * 12/1995 Holt ..................... H01R 13/508 439/275
6,312,268 B1 * 11/2001 Chih-Kai ............. H01R 12/727 439/748
6,971,917 B2 * 12/2005 Faust ................... H01R 13/508 439/619
7,267,578 B2 * 9/2007 Wu ...................... H01R 13/508 439/607.58
7,285,011 B2 * 10/2007 Hardy .................. H01R 13/582 439/582
7,422,478 B2 * 9/2008 Zugel ................... H01R 13/508 439/582

(Continued)

FOREIGN PATENT DOCUMENTS

WO WO-9833237 A1 * 7/1998 ........... H01R 13/518

OTHER PUBLICATIONS

WO_2014077502_A1 original with translation (Year: 2014).*

*Primary Examiner* — Marcus E Harcum
(74) *Attorney, Agent, or Firm* — JCIPRNET

(57) ABSTRACT

The disclosure provides a mini type FAKRA connector, which includes a metal housing, a plastic housing, a pin, and multiple terminals. The plastic housing is assembled to the metal housing, and a portion structure of the metal housing and a portion structure of the plastic housing are overlapped to form a tunnel. The pin is inserted into the tunnel to fix the metal housing and the plastic housing together. The terminals penetrate the metal housing and the plastic housing.

16 Claims, 6 Drawing Sheets

(56) References Cited

U.S. PATENT DOCUMENTS

| | | | | |
|---|---|---|---|---|
| 7,473,132 | B2 * | 1/2009 | Chen | H01R 12/71 439/607.01 |
| 7,762,854 | B1 * | 7/2010 | Peng | H01R 24/50 439/752 |
| 9,401,573 | B1 * | 7/2016 | Fernandez | H01R 24/62 |
| 9,437,953 | B2 * | 9/2016 | Lappoehn | H01R 13/6272 |
| 9,620,882 | B2 * | 4/2017 | Chen | H01R 13/2428 |
| 9,685,735 | B1 * | 6/2017 | Chen | H01R 12/73 |
| 9,780,504 | B2 * | 10/2017 | Wang | H01R 24/60 |
| 11,025,008 | B2 * | 6/2021 | Kim | H01R 13/052 |
| 11,296,445 | B2 * | 4/2022 | Shen | H01R 13/405 |
| 11,888,248 | B2 * | 1/2024 | Cheng | H01R 13/6273 |
| 2015/0024618 | A1 * | 1/2015 | Dovranic | H01R 13/6277 439/321 |
| 2015/0346436 | A1 * | 12/2015 | Pepe | H01R 24/64 385/76 |
| 2016/0181734 | A1 * | 6/2016 | Kao | H01R 13/6474 439/607.05 |
| 2018/0375252 | A1 * | 12/2018 | Suda | H01R 13/6272 |
| 2019/0157823 | A1 * | 5/2019 | Duan | H01R 13/502 |
| 2019/0165507 | A1 * | 5/2019 | Hou | H01R 31/06 |
| 2021/0408712 | A1 * | 12/2021 | Myer | H01R 12/85 |
| 2022/0294147 | A1 * | 9/2022 | Lee | H01R 13/405 |
| 2022/0384978 | A1 * | 12/2022 | Matsuoka | H01R 13/422 |
| 2023/0006393 | A1 * | 1/2023 | Gross | H01R 12/55 |
| 2023/0046378 | A1 * | 2/2023 | Brillo | H01R 13/508 |

* cited by examiner

MINI TYPE FAKRA CONNECTOR

CROSS-REFERENCE TO RELATED APPLICATION

This application claims the priority benefit of China application serial no. 202221511795.9, filed on Jun. 17, 2022. The entirety of the above-mentioned patent application is hereby incorporated by reference herein and made a part of this specification.

BACKGROUND

Technical Field

The disclosure relates to a mini type FAKRA connector.

Description of Related Art

Conventionally, cable connectors for connecting to printed circuit boards (PCBs) have been standardized according to various systems. In automotive technology, a system called FAKRA, which is adopted as a standard in Europe and the United States, is known. The FAKRA is the Automotive Standards Committee (Normenausschuss Kraftfahrzeuge) within the German Standards Association representing international standardization concerns in the automotive field, and the standards promoted by the FAKRA are named FAKRA standards, which adopts the name of the organization that sets the standard system. Generally, in automotive applications, the FAKRA standards are mostly used for GPS, AM/FM radios, mobile phones, airbag systems, multimedia devices, etc.

Generally speaking, regarding automotive RF connectors, most of the automotive RF connectors are coaxial cables or wire-to-board structures. Usually, a rear housing made of zinc alloy materials is used to accommodate terminals partially covered by insulators, a front housing is then made of plastic to accommodate the remaining terminals covered by the insulators, and at the same time, the front housing and the rear housing are combined with each other through a buckle structure.

However, due to the difference in the materials (and characteristics) of the front housing and the rear housing, during the assembly process, the tightness or coverage between the front housing and the rear housing cannot be guaranteed. At the same time, there will be doubts about the structural strength, and problems such as wear and poor durability are prone to occur.

SUMMARY

The disclosure provides an electrical connector and a mini type FAKRA connector, which provide better bonding strength between a metal housing and a plastic housing by means of a pin.

The mini type FAKRA connector of the disclosure includes a metal housing, a plastic housing, a pin, and multiple terminals. The plastic housing is assembled to the metal housing, and a portion structure of the metal housing and a portion structure of the plastic housing are overlapped to form a tunnel. The pin is inserted into the tunnel to fix the metal housing and the plastic housing together. The terminals penetrate the metal housing and the plastic housing.

The electrical connector of the disclosure includes a metal housing, a plastic housing, a pin, and multiple terminals. The plastic housing is assembled to the metal housing, and a portion structure of the metal housing and a portion structure of the plastic housing are overlapped to form a tunnel. The pin is inserted into the tunnel to fix the metal housing and the plastic housing together. The terminals penetrate the metal housing and the plastic housing.

In an exemplary example, the above-mentioned metal housing has a level difference, and the plastic housing has a cover. The cover is stacked on the level difference to form the tunnel. The pin is inverted and moved into the level difference through the cover, so that the pin is clamped between the metal housing and the plastic housing.

In an exemplary example, two side portions opposite to each other of the above-mentioned cover respectively have through holes, each of the through holes and a part of the metal housing form the tunnel, and the pin is inserted into the through holes.

In an exemplary example, the top of the plastic housing has a groove, and two ends opposite to each other of the groove communicate with the through holes on the two side portions opposite to each other, so that the groove and the through holes form the tunnel.

In an exemplary example, the above-mentioned side portions opposite to each other further have notches, respectively, and the notch cuts through the through hole located on the same side portion.

In an exemplary example, the above-mentioned metal housing further has two protrusions, which are respectively located on two sides opposite to each other of the level difference, the protrusion on one of the sides divides the level difference into two gateways, and partial structures of the above-mentioned cover located on the two side portions opposite to each other are respectively moved into or out of the level difference through the gateways.

In an exemplary example, two side portions opposite to each other of the above-mentioned cover have notches, respectively, and the metal housing has two protrusions, which are respectively located on two sides opposite to each other of the level difference, each of the protrusions is moved into the notch to form a part of the tunnel, and the above-mentioned protrusions are staggered in the through hole. The above-mentioned notch divides the side portion into two segments, and the protrusion is located between the two segments.

In an exemplary example, the above-mentioned mini type FAKRA connector is adapted to connect another mini type FAKRA connector along a connecting axial direction, and the pin and the protrusion block each other along the connecting axial direction.

In an exemplary example, the above-mentioned mini type FAKRA connector is adapted to connect another mini type FAKRA connector along the connecting axial direction, the pin is inserted into the tunnel along a longitudinal direction, and the longitudinal direction is perpendicular to the connecting axial direction.

In an exemplary example, the above-mentioned pin interferes with the metal housing and the plastic housing to form a tight fit.

Based on the above, the electrical connector, directed to a coaxial radio frequency (RF) electrical connector, especially directed to the mini FAKRA connector, is combined with a plastic housing and a metal housing to accommodate multiple terminals therein, and at the same time, the portion structures of the plastic housing and the metal housing that are overlapped with each other form a tunnel, so that the pin is inserted into the tunnel to achieve the state of fixing the metal housing and the plastic housing together. Therefore, the metal housing and the plastic housing do not need the design of additional buckle structures, which can simplify the structure and the complexity of the manufacturing process and increase structural strength and durability.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
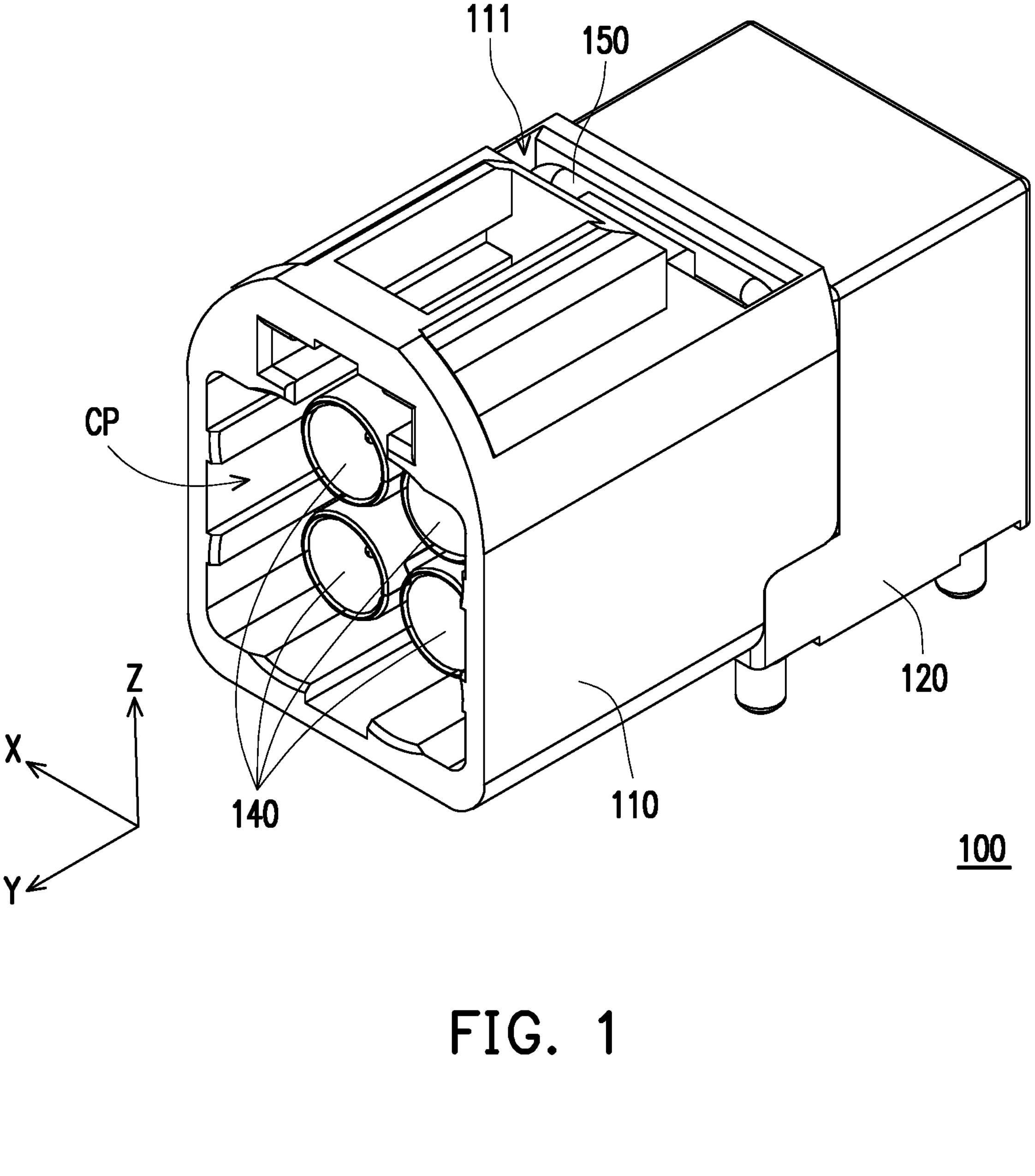
FIG. 1 is a schematic diagram of an electrical connector according to an embodiment of the disclosure.
Figure 2:
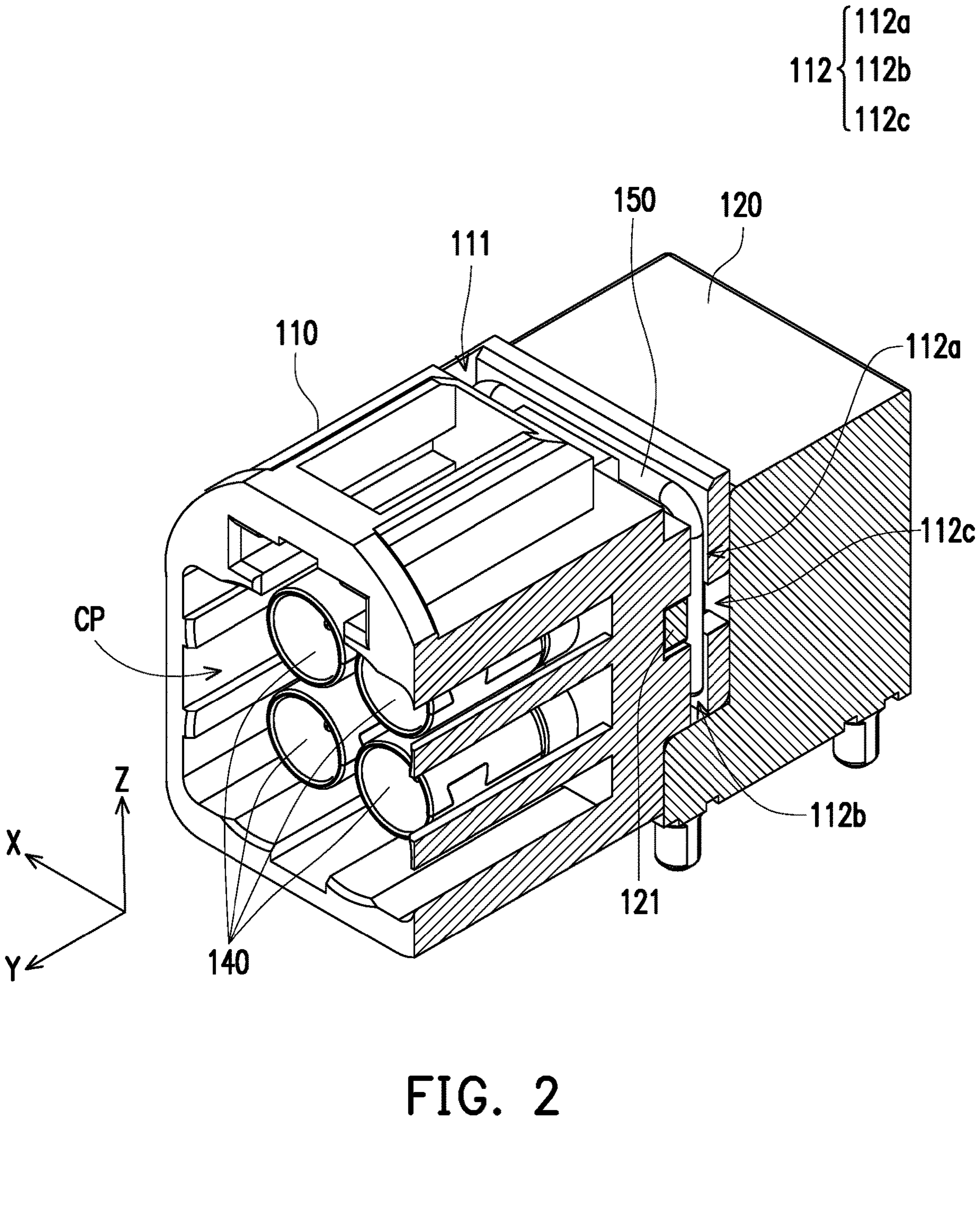
FIG. 2 is a partial cross-sectional view of the electrical connector of FIG. 1.
Figure 3:
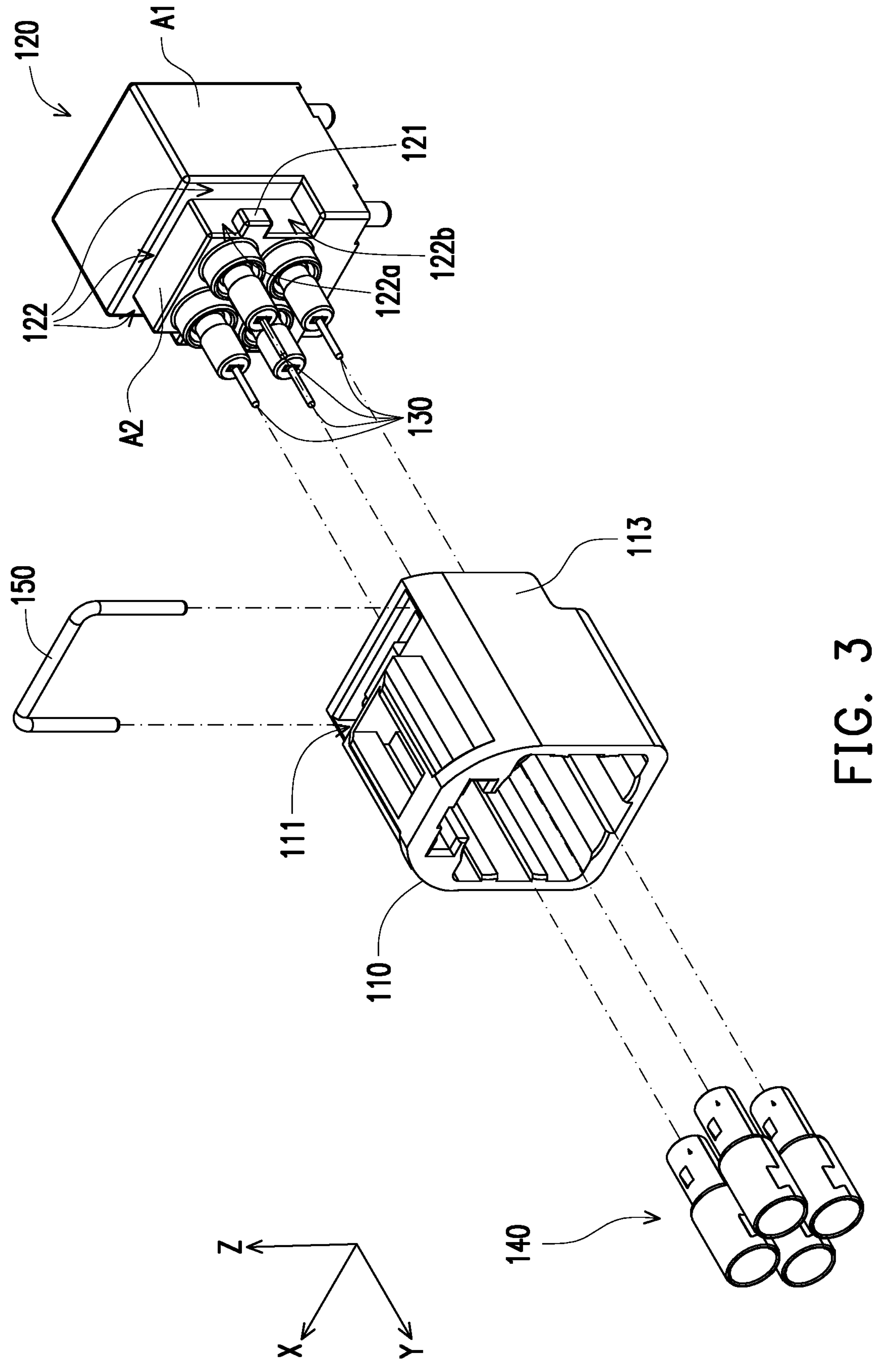
FIGS. 3 and 4 are exploded views of the electrical connector from different perspectives, respectively.
Figure 4:
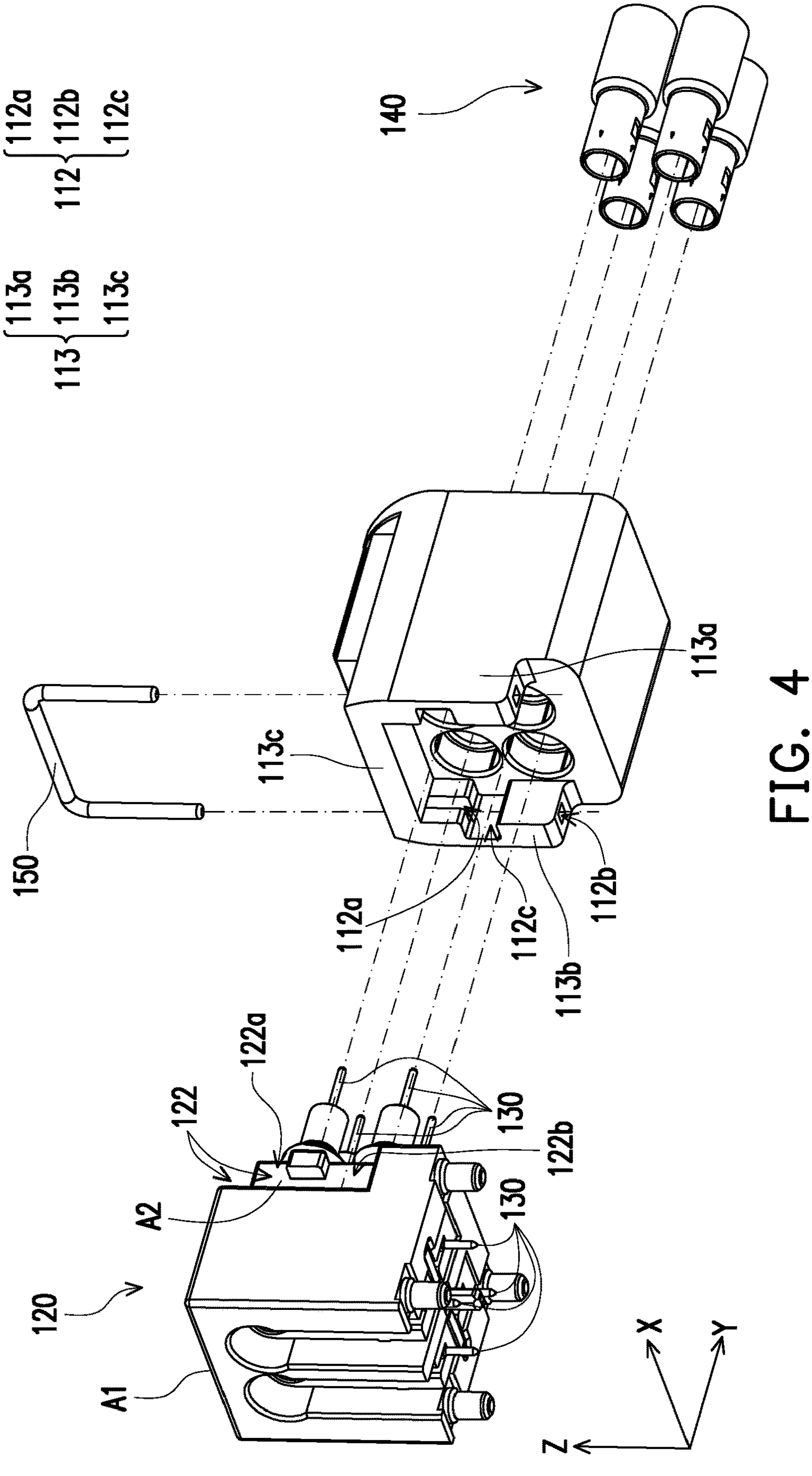

FIG. 1 is a schematic diagram of an electrical connector according to an embodiment of the disclosure. FIG. 2 is a partial cross-sectional view of the electrical connector of FIG. 1. FIGS. 3 and 4 are exploded views of the electrical connector from different perspectives, respectively. At the same time, rectangular coordinates X, Y, and Z are provided to facilitate the description of related components. Please refer to FIGS. 1 to 3 first. In the embodiment, an electrical connector 100 is a mini type FAKRA connector, and is especially disposed on a circuit board (not shown) in an automotive electronic device as a socket electrical connector. The electrical connector 100 includes a metal housing 120, a plastic housing 110, a pin 150, multiple terminals 130, and copper tubes 140. The plastic housing 110 is assembled to the metal housing 120, and a portion structure of the metal housing 120 and a portion structure of the plastic housing 110 are overlapped to form a tunnel (which is to be described in detail later). The pin 150 is inserted into the tunnel to fix the metal housing 120 and the plastic housing 110 together. The terminal 130 penetrates the metal housing 120 and the plastic housing 110, and the part of the terminal 130 passing through the metal housing 120 is then sleeved with the copper tube 140 to facilitate connection with another electrical connector (another mini type FAKRA connector, not shown) to achieve the effect of electrical conduction. Meanwhile, in the embodiment, the electrical connector 100 is connected to or separated from the another electrical connector along a Y-axis by an interface CP of the electrical connector 100.

Referring to FIGS. 3 and 4, the metal housing 120 of the embodiment has a level difference 122, that is, the metal housing 120 includes a base portion A1 and an extending portion A2 whose outer contour is substantially retracted, and the level difference 122 is formed by the retracting of the outer contour. At the same time, the extending portion A2 may also be regarded as being carried at the notch of the base portion A1. Here, the level difference 122 exists on the same three sides of the base portion A1 and the extending portion A2. Correspondingly, the plastic housing 110 has a cover 113 corresponding to the level difference 122, and the cover 113 is stacked on the level difference 122 to form the aforementioned tunnel. Correspondingly, the pin 150 is inverted and moved into the level difference 122 through the cover 113, so that the pin 150 is clamped between the metal housing 120 and the plastic housing 110.

Figure 5:
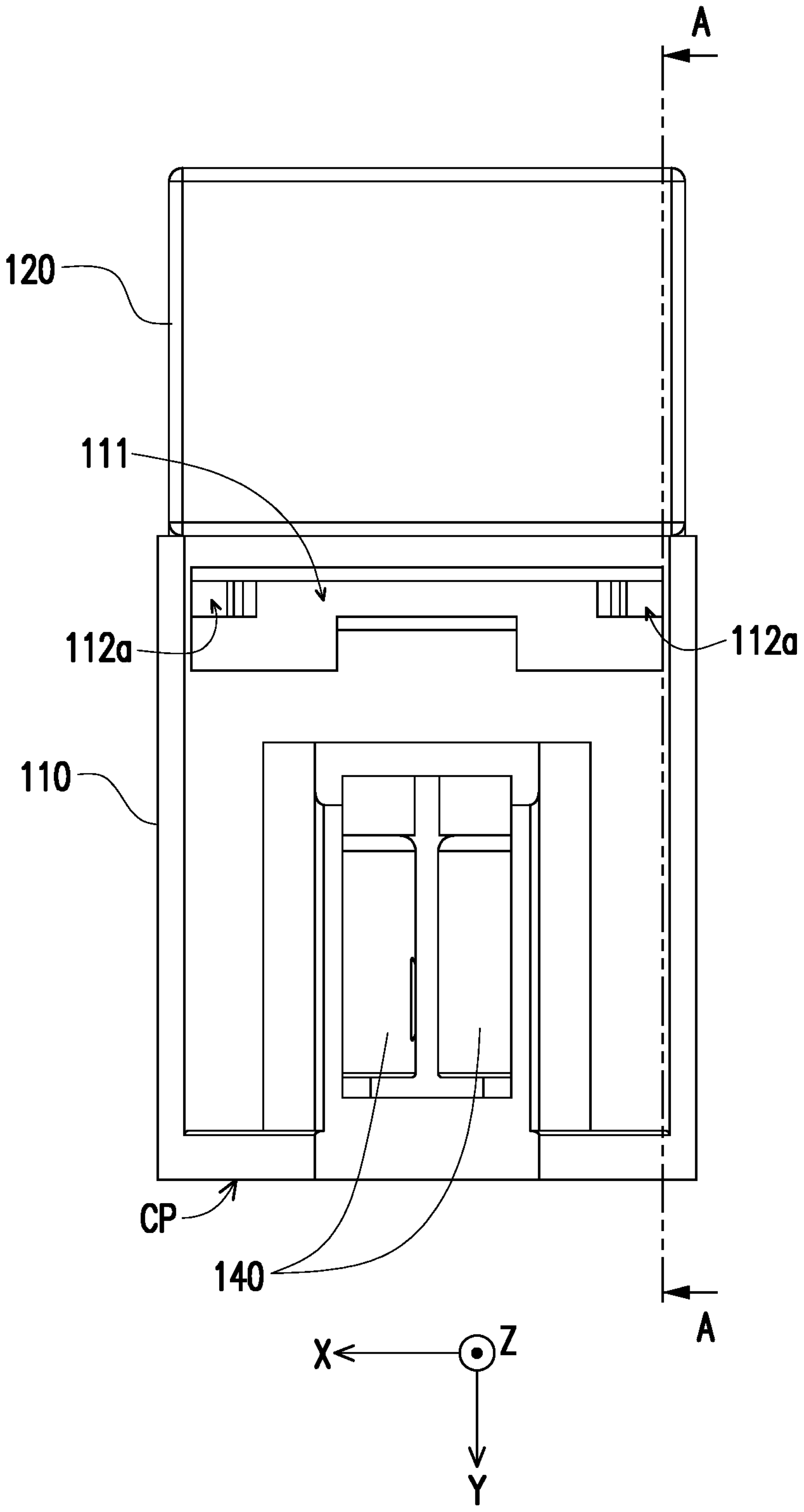
FIG. 5 is a top view of the electrical connector of FIG. 1.
Figure 6:
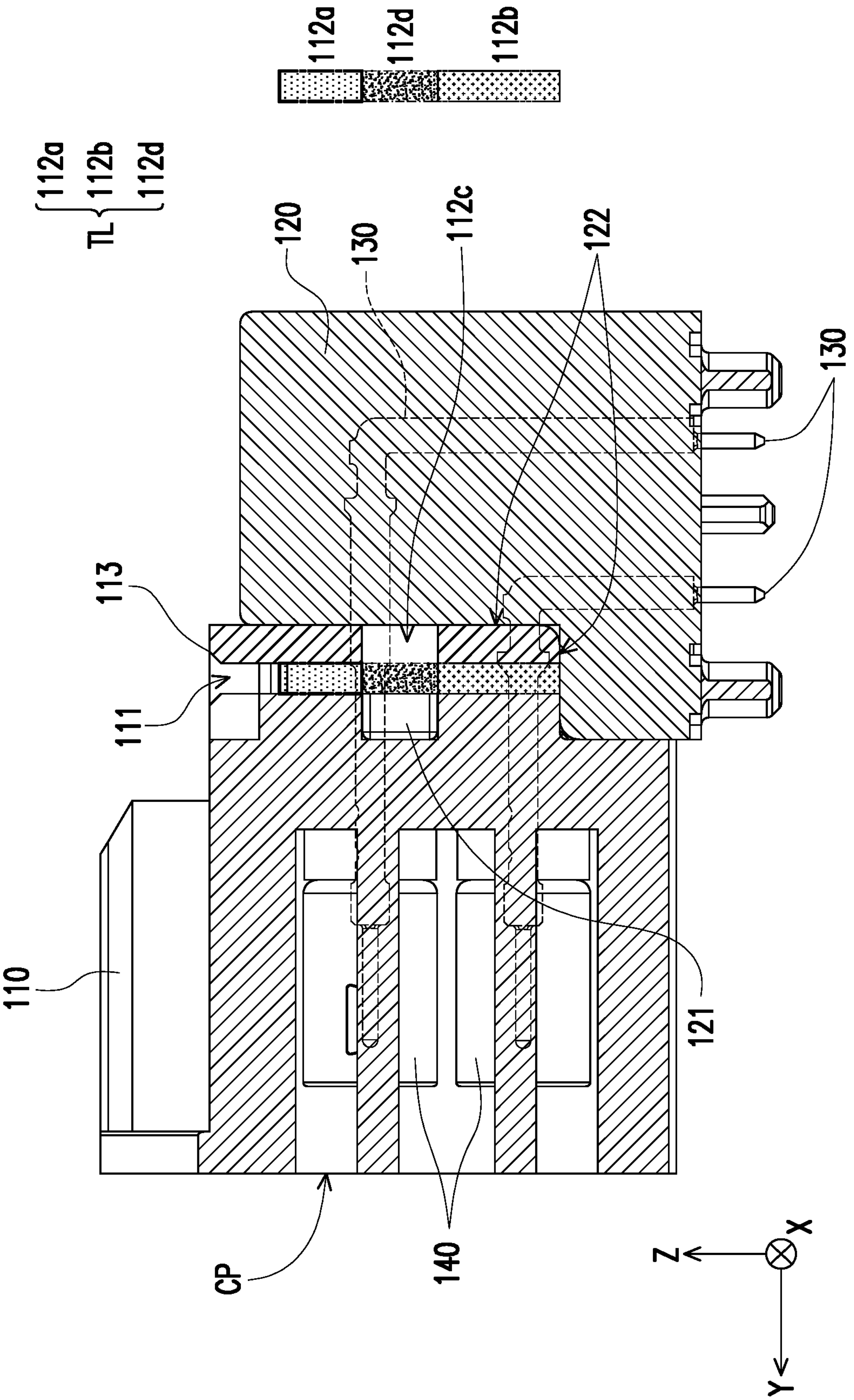
FIG. 6 is a partial structural schematic diagram of the electrical connector of FIG. 5 along a section line A-A.

FIG. 5 is a top view of the electrical connector of FIG. 1. FIG. 6 is a partial structural schematic diagram of the electrical connector of FIG. 5 along a section line A-A. It should further be mentioned that the pin 150 is omitted in FIGS. 5 and 6 to facilitate the identification of the overlapping structure formed by the metal housing 120 and the plastic housing 110. Please refer to FIGS. 5 and 6 and compare with FIG. 3 or FIG. 4. In the embodiment, the cover 113 includes two side portions 113*a* and 113*b* that are opposite to each other and a top portion 113*c*, and the top portion 113*c* is connected between the two side portions 113*a* and 113*b*. Also corresponding to the level difference 122 disposed along the three sides of the metal housing 120, the top 113*c* of the cover 113 further has a groove 111, and the side portions 113*a* and 113*b* opposite to each other of the cover 113 (that is, the opposite two wing structures) respectively have through holes 112*a* and 112*b*. Two ends opposite to each other of the groove 111 communicate with the through holes 112*a* and 112*b* on the side portions 113*a* and 113*b*, the through holes 112*a* and 112*b* on each of the side portions 113*a* and 113*b*, and a part of the metal housing 120 form the tunnel, which is also equivalent to a tunnel TL formed by the groove 111, the through holes 112*a* and 112*b* on the side portions 113*a* and 113*b* opposite to each other, and a part 112*d* for the insertion of the pin 150.

Furthermore, the terminal 130 of the embodiment penetrates into the metal housing 120 from the bottom of the metal housing 120 in a longitudinal direction (a Z-axial direction), and then extends from the metal housing 120 to the plastic housing 110 in a connecting axial direction (a Y-axial direction), which has generally an L-shaped extension path.

Please refer to FIGS. 3, 4, and 6 again. The side portions 113*a* and 113*b* opposite to each other of the cover 113 further have notches 112*c*, respectively. The notches 112*c* cut off the through holes 112*a* and 112*b* located on the same side portions 113*a* and 113*b*, which is equivalent to the situation where the notch 112*c* separates each of the side portions 113*a* and 113*b* of the cover 113 into two structural segments, and the two structural segments have through holes 112*a* and 112*b*, respectively. In contrast, the metal housing 120 further has two protrusions 121 located on two sides opposite to each other of the level difference 122, respectively, and the protrusion 121 on one of the sides distinguishes the level difference 122 into two gateways 122*a* and 122*b*.

Because the side portions 113*a* and 113*b* opposite to each other of the cover 113 respectively have the notches 112*c*, the two protrusions 121 of the metal housing 120 are moved into the notches 112*c* during the assembly process of the metal housing 120 and the plastic housing 110 to form a part of the tunnel TL. In other words, the portion structures of the metal housing 120 and the plastic housing 110 that are overlapped with each other together with the groove 111 of the plastic housing 110 form the tunnel TL for the pin 150 to be inserted into, and the protrusion 121 moved into the notch 112*c* is equivalent to the notch 112*c* inserted into the through holes 112*a* and 112*b* and the part between the two structural segments.

Please refer to FIG. 6 again and compare with FIG. 2. Before the insertion of the pin 150, the metal housing 120 and the plastic housing 110 do not have a mutual clamping or latching relationship with each other. Therefore, the protrusion 121 moves along the notch 112*c*, or the two structural segments of the cover 113 can still be moved into and out of the level difference 122 along the gateways 122*a* and 122*b*. It can be clearly recognized that after being moved into the notch 112*c*, the protrusion 121 is dislocated from the through holes 112*a* and 112*b* along a Z axis (the through holes 112*a* and 112*b* and their connecting lines are parallel to the Z axis). In this way, when the pin 150 is inserted into the tunnel TL, two forks opposite to each other of the pin 150 are respectively equivalent to passing through the groove 111, the through hole 112*a*, a part of the notch 112*c*, and the through hole 112*b* in sequence, that is, being inserted along the longitudinal direction (the Z-axial direction). The longitudinal direction is perpendicular to the aforesaid connecting axial direction (the Y-axial direction), so that the pin 150 and the protrusion 121 block each other along the connecting axial direction.

In short, as shown in FIG. 6, the corresponding structural configurations from top to bottom along the Z axis are the structural segment with the through hole 112*a*, the protrusion 121 (and the notch 112*c*) and the structural segment with the through hole 112*b*. The two structural segments are equivalent to taking the position of the protrusion 121 as the center of symmetry (relative to the Z axis), which can result in the situation that when the fork on one side of the pin 150 is inserted, in the Z-axial direction, the middle section of the fork is blocked by the protrusion 121, and the upper section and the lower section of the fork are blocked by the structural segment with the through hole 112*a* and the structural segment with the through hole 112*b*, respectively, thereby effectively providing stable component stop relationship.

In addition, the pin 150 of the embodiment substantially interferes with the metal housing 120 and the plastic housing 110 to form a structural tight fit, so as to maintain the stability and structural strength after the metal housing 120 and the plastic housing 110 are combined.

To sum up, in the above-mentioned embodiments of the disclosure, the mini FAKRA connector is combined with a plastic housing and a metal housing to accommodate multiple terminals therein, and the portion structures of the plastic housing and the metal housing that are overlapped with each other form a tunnel, so that the pin is inserted into the tunnel to achieve the state of fixing the metal housing and the plastic housing together. Therefore, the metal housing and the plastic housing do not need the design of additional buckle structures, which can simplify the structure and the complexity of the manufacturing process and increase structural strength and durability.

Further, the portion structures of the plastic housing and the metal housing that are overlapped with each other include the through holes and the notches of the plastic housing and the part of the level difference of the metal housing, which further forms the tunnel together with the groove on the top of the plastic housing. When the two sides opposite to each other of the pin are inserted into the tunnel, respectively, the pin, the protrusions of the metal housing, and the structural segments of the plastic housing block each other along the connecting axial direction, so as to achieve a stable bonding and fixation effect by the configuration in which the structural segments and the protrusions are staggered with each other for the pin to be inserted into therein.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A mini type FAKRA connector, comprising:
- a metal housing;
- a plastic housing, assembled to the metal housing, and a portion structure of the metal housing and a portion structure of the plastic housing being overlapped to form a tunnel;
- a pin, inserted into the tunnel to fix the metal housing and the plastic housing together; and
- a plurality of terminals, penetrating the metal housing and the plastic housing, wherein the metal housing has a level difference, the plastic housing has a cover, the cover is stacked on the level difference to form the tunnel, the pin is inverted and moved into the level difference through the cover, so that the pin is clamped between the metal housing and the plastic housing, wherein two side portions opposite to each other of the cover have notches, respectively, and the metal housing has two protrusions, which are respectively located on two sides opposite to each other of the level difference, each of the protrusions is staggered with through holes, each of the protrusions is moved into the notch to form a part of the tunnel, the notch divides the side portion into two segments, and the protrusion is located between the two segments.

2. The mini type FAKRA connector according to claim 1, wherein the two side portions opposite to each other of the cover respectively have through holes, and the through holes on each of the side portions and a part of the metal housing form the tunnel, and the pin is inserted into the through holes.

3. The mini type FAKRA connector according to claim 2, wherein a top of the plastic housing has a groove, and two ends opposite to each other of the groove communicate with the through holes on the two side portions opposite to each other, so that the groove and the through holes form the tunnel.

4. The mini type FAKRA connector according to claim 2, wherein the two side portions opposite to each other further have notches, respectively, and the notches cut off the through holes located on the same side portions.

5. The mini type FAKRA connector according to claim 2, wherein the metal housing further has two protrusions, which are respectively located on two sides opposite to each other of the level difference, the protrusion on one of the sides divides the level difference into two gateways, and partial structures of the cover located on the two side portions opposite to each other are respectively moved into or out of the level difference through the gateways.

6. The mini type FAKRA connector according to claim 1, wherein the mini type FAKRA connector is adapted to connect another mini type FAKRA connector along a connecting axial direction, and the pin and the protrusion block each other along the connecting axial direction.

7. The mini type FAKRA connector according to claim 1, wherein the mini type FAKRA connector is adapted to connect another mini type FAKRA connector along a connecting axial direction, the pin is inserted into the tunnel in a longitudinal direction, and the longitudinal direction is perpendicular to the connecting axial direction.

8. The mini FAKRA connector according to claim 1, wherein the pin interferes with the metal housing and the plastic housing to form a tight fit.

9. An electrical connector, comprising:

a metal housing;

a plastic housing, assembled to the metal housing, and a portion structure of the metal housing and a portion structure of the plastic housing being overlapped to form a tunnel;

a pin, inserted into the tunnel to fix the metal housing and the plastic housing together; and a plurality of terminals, penetrating the metal housing and the plastic housing, wherein the metal housing has a level difference, the plastic housing has a cover, the cover is stacked on the level difference to form the tunnel, the pin is inverted and moved into the level difference through the cover, so that the pin is clamped between the metal housing and the plastic housing, wherein two side portions opposite to each other of the cover have notches, respectively, and the metal housing has two protrusions, which are respectively located on two sides opposite to each other of the level difference, each of the protrusions is staggered with through holes, each of the protrusions is moved into the notch to form a part of the tunnel, the notch divides the side portion into two segments, and the protrusion is located between the two segments.

10. The electrical connector according to claim 9, wherein the two side portions opposite to each other of the cover respectively have through holes, and the through holes on each of the side portions and a part of the metal housing form the tunnel, and the pin is inserted into the through holes.

11. The electrical connector according to claim 10, wherein a top of the plastic housing has a groove, and two ends opposite to each other of the groove communicate with the through holes on the two side portions opposite to each other, so that the groove and the through holes form the tunnel.

12. The electrical connector according to claim 10, wherein the two side portions opposite to each other further have notches, respectively, and the notches cut off the through holes located on the same side portions.

13. The electrical connector according to claim 10, wherein the metal housing further has two protrusions, which are respectively located on two sides opposite to each other of the level difference, the protrusion on one of the sides divides the level difference into two gateways, and partial structures of the cover located on the two side portions opposite to each other are respectively moved into or out of the level difference through the gateways.

14. The electrical connector according to claim 9, wherein the connector is a mini type FAKRA connector which is adapted to connect another mini type FAKRA connector along a connecting axial direction, and the pin and the protrusion block each other along the connecting axial direction.

15. The electrical connector according to claim 9, wherein the connector is a mini type FAKRA connector which is adapted to connect another mini type FAKRA connector along a connecting axial direction, the pin is inserted into the tunnel in a longitudinal direction, and the longitudinal direction is perpendicular to the connecting axial direction.

16. The electrical connector according to claim 9, wherein the pin interferes with the metal housing and the plastic housing to form a tight fit.

* * * * *